Sept. 6, 1927.　　　　　　　　　　　　　　　　　　1,641,311
A. G. BARRETT ET AL
COVER FOR APPLICATION TO STEERING WHEEL HANDLES
OF MOTOR VEHICLES AND THE LIKE
Filed May 15. 1925　　　2 Sheets-Sheet 2

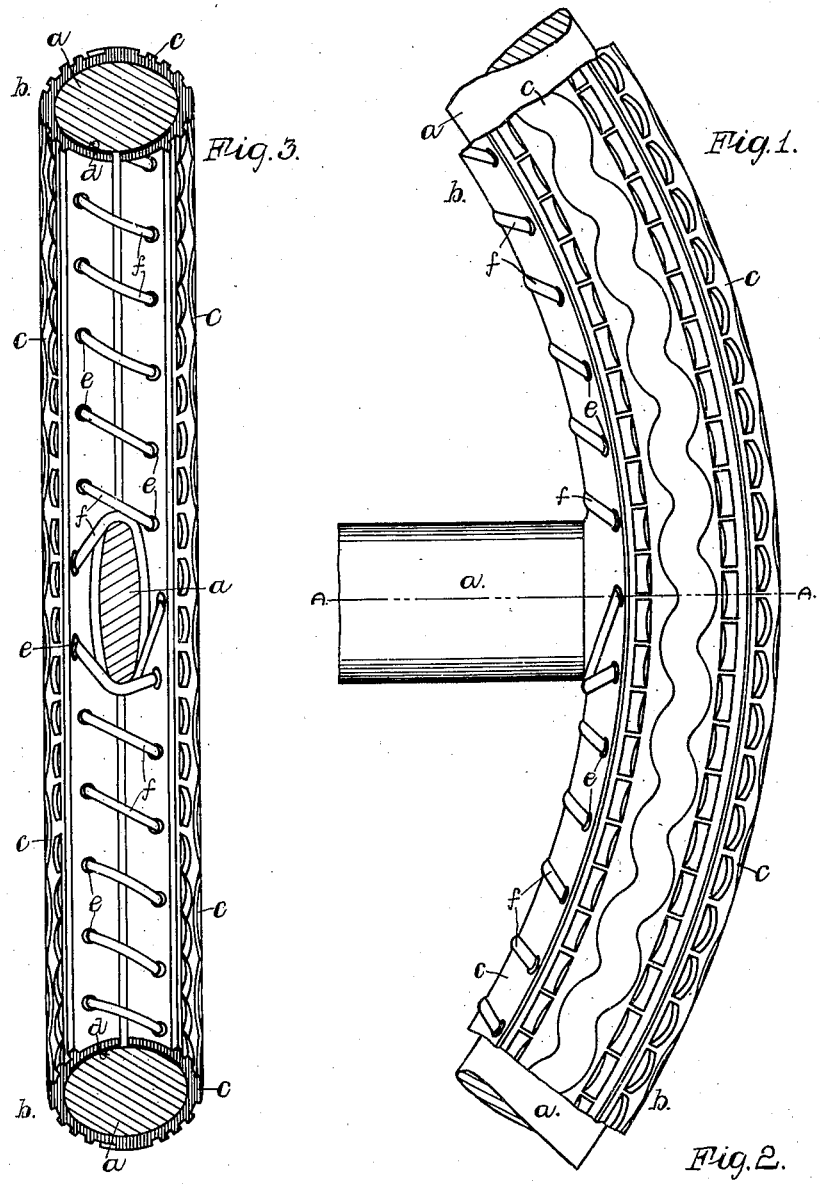
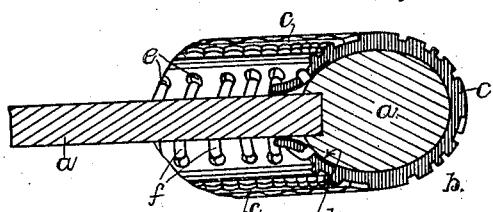

Inventors:
Alfred G. Barrett and
Hubert H. Burton
by Barthel & Barthel
Attys.

Patented Sept. 6, 1927.

1,641,311

UNITED STATES PATENT OFFICE.

ALFRED GEORGE BARRETT AND HUBERT HENRY BURTON, OF LEICESTER, ENGLAND.

COVER FOR APPLICATION TO STEERING-WHEEL HANDLES OF MOTOR VEHICLES AND THE LIKE.

Application filed May 15, 1925, Serial No. 30,603, and in Great Britain May 21, 1924.

This invention relates to covers for application to the steering wheel handles of motor vehicles, and the like, in order to provide for the better hand-gripping of said wheel handles.

A cover, according to our invention, comprises an endless rubber band which is—in cross section—of curved or bow configuration, and each side whereof is reinforced by a strip of canvas, or the like, cut on the bias; and spaced holes—extending through both the rubber and the canvas, or the like—being provided near the edges of the band, by the aid of which holes said cover may be laced around a wheel handle.

In the accompanying sheet of explanatory drawings:—

Fig. 1 is an elevation of a part of a steering wheel handle provided with a cover, according to our invention.

Fig. 2 is a transverse section, taken as on line A—A, Fig. 1.

Fig. 3 is an inverted plan view of Fig. 1.

Figure 4:
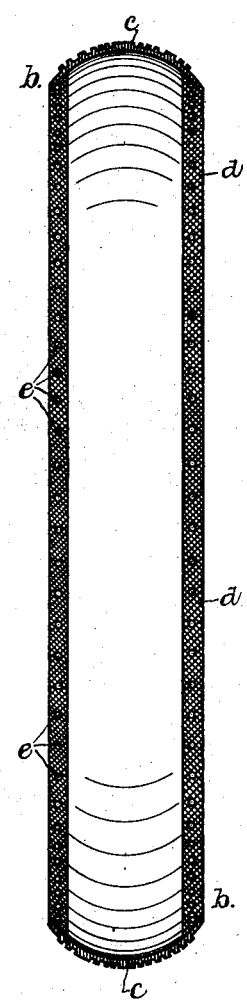
Fig. 4 is a reduced cross section of the cover detached.

In said drawings, $a$ represents the steering wheel handle of a motor vehicle, and $b$ generally designates the cover, $c$ being an endless rubber band of curved or bow configuration in cross section (see Fig. 4), and $d$ side reinforcing strips of canvas cut on the bias: $e$ are holes extending through both rubber and canvas near the edges of the band $c$, and $f$ is a lacing cord passed through the holes $e$ and securing the cover to the wheel handle $a$.

Figure 5:
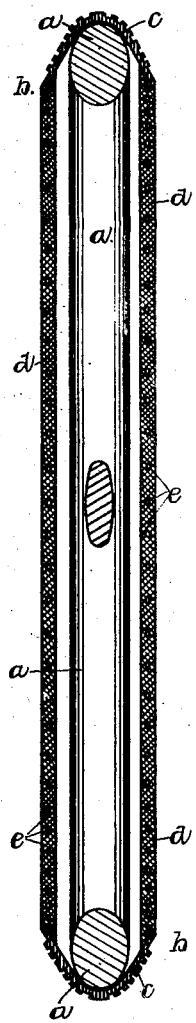
Fig. 5 is a reduced cross section of the cover and wheel handle, prior to the cover being laced to the latter.

The cutting of the said canvas strips $d$ on the bias permits of the cover being stretched over the wheel handle (Fig. 5).

According to a convenient mode of manufacture, the band $c$—being made up from the strips of unvulcanized rubber, with the canvas reinforcing strips $d$—is moulded in any pattern desired, face downward on a flat drum, canvas being wrapped around the band in order to press the rubber into the pattern on the mould. When the rubber is almost completely vulcanized said strip of binding canvas is unwound, and the band, which has the pattern on the inside, is changed round so that the pattern becomes on the outside. This flat band is now stretched over a circular former of the required shape and size, so that the center of the band is forced outward, the sides in consequence falling inward. The former-ring, with the band extending on it, is inserted in a hot chamber for a short period, and after being taken out and removed from the former-ring the band will largely retain the shape or configuration of the said former.

What we claim as our invention and desire to secure by Letters Patent is:—

A cover for the spoke supported rim of a steering wheel of a motor vehicle, said cover comprising an endless band of rubber fitted over the wheel rim with the edges of the band brought close together on the inner wall of the wheel rim in the plane of the spoke and embracing the outer ends of the spokes, a strip of canvas cut on the bias and applied to the inner wall of the cover at each edge thereof so as to provide stretchable reinforced cover edges that may be drawn towards each other, and lacing connecting the cover edges and extending about the wheel spokes to prevent circumferential slippage of said cover on said rim wheel.

In testimony whereof we affix our signatures.

ALFRED GEORGE BARRETT.
HUBERT HENRY BURTON.